(12) United States Patent
Yamazaki et al.

(10) Patent No.: US 6,893,491 B2
(45) Date of Patent: May 17, 2005

(54) WATER BASE INK FOR INK-JET RECORDING

(75) Inventors: Hideto Yamazaki, Nagoya (JP); Yoshito Toyoda, Nagoya (JP); Noriatsu Aoi, Ichinomiya (JP); Masashi Tsuda, Aichi-ken (JP)

(73) Assignee: Brother Kogyo Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/624,992

(22) Filed: Jul. 22, 2003

(65) Prior Publication Data

US 2004/0123774 A1 Jul. 1, 2004

(30) Foreign Application Priority Data

Jul. 23, 2002 (JP) .......................................... 2002-214199

(51) Int. Cl.[7] .......................... C09D 11/02; G01D 11/00
(52) U.S. Cl. ............................... 106/31.86; 106/31.75; 347/100
(58) Field of Search .......................... 106/31.86, 31.75; 347/100

(56) References Cited

U.S. PATENT DOCUMENTS

| | | | | |
|---|---|---|---|---|
| 5,667,569 A | * | 9/1997 | Fujioka | 106/31.58 |
| 5,938,829 A | * | 8/1999 | Higashiyama et al. | 106/31.58 |
| 5,976,233 A | * | 11/1999 | Osumi et al. | 106/31.86 |
| 6,176,908 B1 | * | 1/2001 | Bauer et al. | 106/31.15 |
| 6,264,731 B1 | * | 7/2001 | Gundlach et al. | 106/31.58 |
| 6,387,168 B1 | * | 5/2002 | Koitabashi et al. | 106/31.6 |
| 6,468,337 B1 | * | 10/2002 | Gundlach et al. | 106/31.28 |
| 6,471,757 B1 | * | 10/2002 | Koitabashi et al. | 106/31.28 |
| 6,550,903 B2 | * | 4/2003 | Katsuragi et al. | 347/96 |
| 6,613,136 B1 | * | 9/2003 | Arita et al. | 106/31.58 |
| 6,644,798 B2 | * | 11/2003 | Katsuragi et al. | 347/100 |
| 2002/0002930 A1 | * | 1/2002 | Yamashita et al. | 106/31.6 |

* cited by examiner

*Primary Examiner*—David Sample
*Assistant Examiner*—Veronica F. Faison
(74) *Attorney, Agent, or Firm*—Reed Smith LLP

(57) ABSTRACT

A water base ink for ink-jet recording contains a self-dispersing type pigment, glycol ether, and water. In the glycol ether, the number of carbon atoms of an ethylene oxide moiety is not less than 8, and the solubility in water at 25° C. is not less than 1%. The ink reduces the blurring of a recorded image which would be otherwise caused by the feathering on the paper surface. The ink is excellent in drying performance on the paper surface, and the ink makes it possible to stably disperse the pigment.

22 Claims, 1 Drawing Sheet

WATER BASE INK FOR INK-JET RECORDING

BACKGROUND OF THE INVENTION

1. Field of the Invention

The present invention relates to a water base ink for ink-jet recording which makes it possible to reduce the blurring on the paper surface, which is excellent in drying performance, and in which a pigment is stably dispersed.

2. Description of the Related Art

In the ink-jet recording method, ink droplets are formed by the ink discharge method including, for example, the electrostatic attraction method, the method in which mechanical vibration or displacement is applied to the ink by using a piezoelectric element, and the method in which bubbles are generated by heating the ink to utilize the pressure generated thereby. All or a part of the ink droplets are adhered to a recording medium such as paper to perform the recording.

The ink-jet recording method remarkably comes into widespread use in recent years, because the method involves no process of, for example, development and fixation, and it is easy to realize the color printing. Recently, the advance is rapidly made for the realization of the high speed and the highly fine definition in the printing performed by the ink-jet printer. Further, for example, the color printer is dominantly used, which makes it possible to perform the printing on the regular paper.

In such circumstances, for example, the following high performance is required for the water base ink for ink-jet recording to be used for the ink-jet recording method. That is, the jetting operation can be stably performed without causing any clog-up in the ink flow passage and at the tip of the head of the ink-jet printer. The image and the coloration are vivid. Neither fading nor discoloration occurs after the formation of the image. In particular, it is more demanded in recent years to perform the recording on the regular paper rather than on the exclusive ink-jet paper in consideration of the running cost and the environment. It is required that a vivid image without any blurring is obtained even when the recording is performed on the regular paper.

The water base ink for ink-jet recording is roughly classified into the dye ink and the pigment ink. The dye ink is an ink which has been used from the beginning of the development of the ink-jet recording method. The dye ink is excellent in variety of numbers of colors and in vividness of hue or tone. However, the dye ink has such a drawback that the dye ink is inferior in water resistance and weather resistance, because the dye itself exhibits the water solubility. On the other hand, the pigment ink is satisfactory in water resistance and weather resistance. However, the pigment ink has, for example, the following drawbacks. That is, the production steps are complicated, because it is necessary to finely disperse the pigment in water by using a dispersing machine. The pigment, which has been dispersed in water, is aggregated and precipitated in a time-dependent manner. Further, the pigment ink is inferior in vividness of hue or tone.

Researches have been made in order to improve the drawbacks of the dye ink and the pigment ink. In recent years, the pigment ink has been especially improved remarkably. Pigment inks, which are excellent in dispersion stability and which hardly cause the aggregation and the precipitation, have been developed. Such pigment inks include, for example, those in which the dispersing agent is improved and those in which the surface of the pigment is treated so that the electric or physical repulsion is generated without using any dispersing agent. The improved dispersing agent, which is used in the former pigment ink, is often a high molecular weight compound. In this case, the high molecular weight compound is adsorbed to the surface of the pigment, and the pigment is prevented from the aggregation by the steric hindrance action. On the other hand, the pigment, which is used in the latter pigment ink, is called "self-dispersing type pigment". In this case, for example, a group, which has the electric charge, is added to the surface of the pigment. The pigment is prevented from the aggregation by, for example, the electric repulsion.

When the recording is performed on the regular paper by using the water base ink for ink-jet recording as described above, for example, the following problems arise. That is, the feathering, which mainly causes the blurring of the recorded image, appears in some cases, and the ink is adhered to the hand in other cases when the paper is touched after the recording, because of the unsatisfactory drying performance on the paper surface. The feathering is such a phenomenon that the ink is spread nonuniformly along the surface fibers of the paper and the edge is notched. In particular, when the recording is performed on the recycled paper composed of various paper components, the problems concerning the feathering and the drying performance on the paper surface appear more conspicuously because of different velocities of permeation of the ink into the fibers.

In the case of the general water base ink for ink-jet recording, a water-soluble organic solvent such as glycol ethers, which is referred to as the moistening agent or the permeating agent, is added in order that the permeability into the paper is controlled to solve the problems concerning the feathering and the drying performance on the paper surface. However, it is difficult to realize both of the reduction of the blurring on the paper surface and the drying performance. Further, the pigment ink, which is based on the use of the dispersing agent, has involved such a problem that the dispersion stability of the pigment is destroyed, resulting in the aggregation or the increase in viscosity.

SUMMARY OF THE INVENTION

The present invention has been made in order to solve the problems as described above, an object of which is to provide a water base ink for ink-jet recording which makes it possible to reduce the blurring on the paper surface, which is excellent in drying performance, and in which a pigment is stably dispersed.

According to the present invention, there is provided a water base ink for ink-jet recording comprising a self-dispersing type pigment; water; and glycol ether in which a number of carbon atoms of an ethylene oxide moiety is not less than 8. Even when the self-dispersing type pigment is used together in the ink, then the dispersion performance of the pigment is maintained, and the pigment is prevented from the aggregation or the increase in viscosity, because the water base ink for ink-jet recording of the present invention contains the glycol ether in which the number of carbon atoms of the ethylene oxide moiety is not less than 8.

In the ink of the present invention, the glycol ether may be contained by not less than 5% by weight, especially by not less than 7% by weight, in view of the drying performance and the prevention of any blurring of the ink. As for the glycol ether, it is desirable to use glycol ether which has a solubility in water at 25° C. of not less than 1%. In this viewpoint, the glycol ether is desirably tetraethylene glycol butyl ether or tripropylene glycol butyl ether. It is enough that the ink of the present invention contains no other glycol ether except for the glycol ether described above. The ink may further contain 2-pyrrolidone.

According the present invention, there is provided an ink cartridge comprising the water base ink for ink-jet recording of the present invention.

DESCRIPTION OF THE PREFERRED EMBODIMENTS

Figure 1:
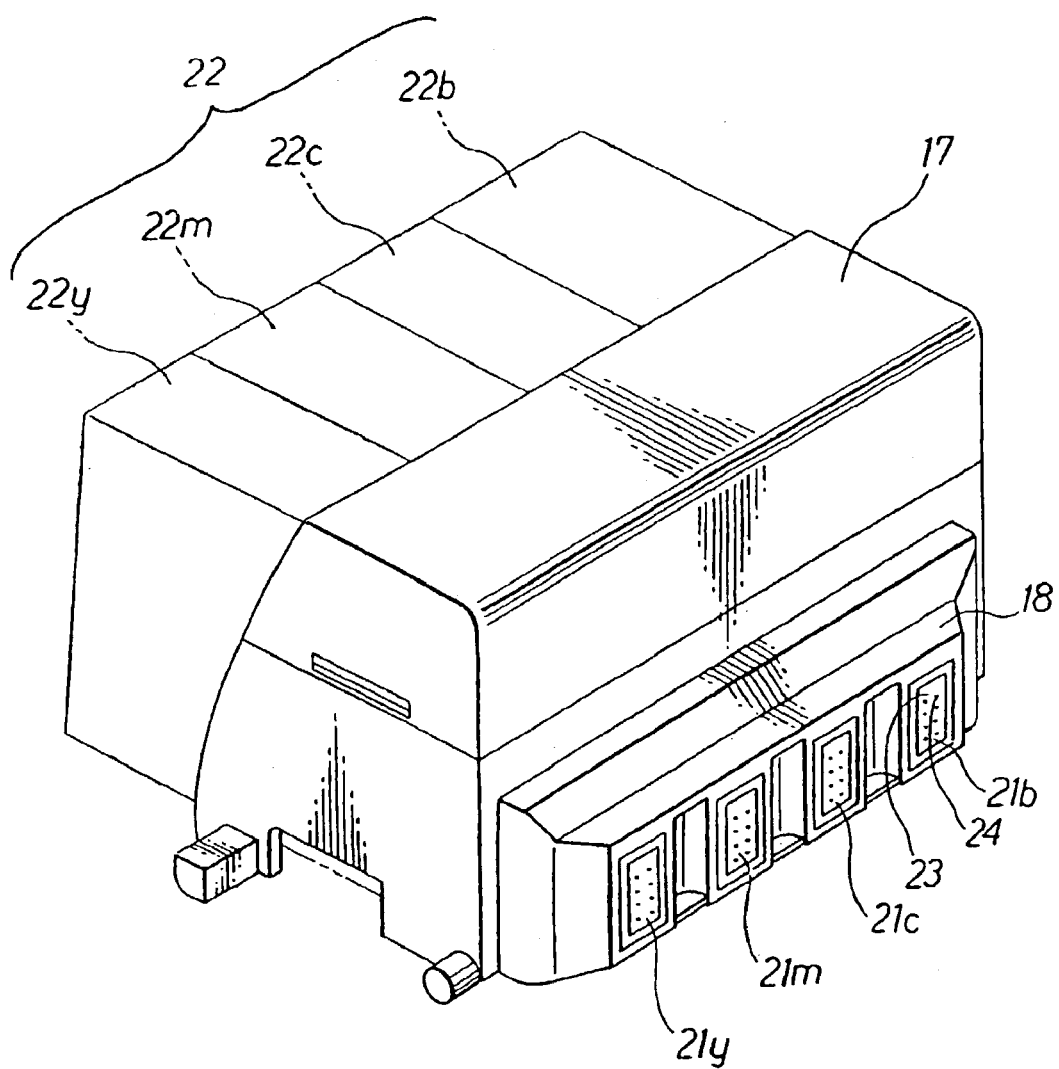
FIG. 1 shows an ink jet head which ejects four color inks and is provided with a color ink cartridge which contains the water base ink for ink-jet recording in accordance with the invention.

The water base ink for ink-jet recording of the present invention contains the self-dispersing type pigment, the glycol ether, and the water. The self-dispersing type pigment has a hydrophilic functional group and/or a salt thereof on the surface of the pigment particle, the hydrophilic functional group and/or the salt thereof being introduced by the chemical bond directly or by the aid of any polyvalent group. Accordingly, the self-dispersing type pigment is dispersible in water without using any dispersing agent. One species or two or more species of the hydrophilic functional group and/or the salt thereof may be introduced into one pigment particle. The type and the number of the hydrophilic functional group or groups and/or the salt or salts thereof to be introduced into the pigment particle are determined, for example, on the dispersion stability in the ink, the density of the color, and the drying performance at the front surface of the ink-jet head.

The pigment, which can be used for the self-dispersing type pigment, is not specifically limited. It is possible to any one of inorganic pigments and organic pigments. The self-dispersing type pigment may be used singly. Alternatively, two or more of the self-dispersing type pigments may be used in combination.

The black pigment may be exemplified, for example, by inorganic pigments including, for example, carbon blacks such as Furnace Black, Lamp Black, Acetylene Black, and Channel Black; and organic pigments including, for example, Aniline Black.

The yellow pigment may include, for example, Color Index No. Pigment Yellow 1, 2, 3, 4, 5, 6, 7, 10, 11, 12, 13, 14, 16, 17, 24, 55, 61, 61:1, 65, 73, 74, 75, 81, 83, 93, 94, 95, 97, 98, 99, 100, 108, 109, 110, 113, 117, 120, 123, 124, 128, 129, 133, 138, 139, 147, 151, 153, 154, 155, 156, 167, 168, 172, 173, and 180.

The magenta pigment may include, for example, Color Index No. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 88, 112, 114, 122, 123, 144, 146, 149, 150, 166, 168, 170, 171, 175, 176, 177, 178, 179, 185, 187, 188, 189, 190, 194, 202, 209, 214, 216, 219, 220, 224, 242, and 245, and Color Index No. Pigment Violet 19, 23, 31, 32, 33, 36, 38, 43, and 50.

The cyan pigment may include, for example, Color Index No. Pigment Blue 15, 15:1, 15:2, 15:3, 15:4, 15:6, 16, 17, 17:1, 18, 19, 21, 22, 25, 56, 60, 64, 65, and 66.

The functional group and/or the salt thereof is not specifically limited. However, for example, at least one functional group and/or a salt thereof selected from the group consisting of those represented by the following formulas (1) is preferably used.

$$—OM, —COOM, —CO—, —SO_3M, —SO_2M, —SO_2NH_2, \\ —RSO_2M, —PO_3HM, —PO_3M_2, —SO_2NHCOR, —NH_3, \\ —NR_3 \quad (1)$$

In the formulas (1), M represents hydrogen atom, alkali metal, ammonium, or organic ammonium, and R represents alkyl group having a number of carbon atom or carbon atoms of 1 to 12, phenyl group, naphthyl group, phenyl group having substituted group, or naphthyl group having substituted group.

There is no special limitation to the method for introducing the functional group and/or the salt thereof by the chemical bond onto the surface of the pigment particle directly or by the aid of the polyvalent group. It is possible to use a variety of known surface treatment methods. There may be exemplified, for example, a method in which ozone or a sodium hypochlorite solution is allowed to act on commercially available oxidized carbon black to further oxidize and treat the carbon black so that the surface is treated to be more hydrophilic; a method in which an organic pigment is dispersed in a solvent in which the organic pigment is insoluble or scarcely soluble to introduce sulfone group by using a sulfonating agent; a method in which an organic pigment is dispersed in a basic solvent which forms a complex together with sulfur trioxide and the surface of the organic pigment is treated by adding sulfur trioxide to introduce sulfone group or sulfone amino group; and a method in which a water-solubilizing functional group and a polymer are introduced by the aid of phenylene group bonded to carbon black by the azo coupling reaction.

A water-soluble dye may be further blended with the water base ink for ink-jet recording of the present invention in order to regulate or adjust the color. The water-soluble dye may include, for example, Color Index No. Basic Red 1, 1:1, 2, 12, 13, 14, 18, 22, 27, 28, 29, 34, 38., 39, 46, 46:1, 67, 69, and 70; Color Index No. Basic Violet 1, 2, 3, 4, 5, 7, 8, 10, 11, 11:1, 20, and 33; Color Index No. Basic Blue 3, 6, 7, 9, 11, 12, 16, 17, 24, 26, 41, 47, and 66; Color Index No. Basic Green 1, 4, and 5; Color Index No. Basic Yellow 1, 11, 19, 21, 24, 25, 28, 29, 36, 45, 51, 67, and 73; Color Index No. Basic Orange 14, 21, 22, and 32; Color Index No. Basic Brown 1 and 4; Color Index No. Direct Black 17, 19, 32, 51, 71, 108, 146, 154, and 168; Color Index No. Direct Blue 6, 22, 25, 71, 86, 90, 106, and 199; Color Index No. Direct Red 1, 4, 17, 28, 83, and 227; Color Index No. Direct Yellow 12, 24, 26, 86, 98, 132, and 142; Color Index No. Direct Orange 34, 39, 44, 46, and 60; Color Index No. Direct Violet 47, 48, and 107; Color Index No. Direct Brown 109; Color Index No. Direct Green 59; Color Index No. Acid Black 2, 7, 24, 26, 31, 52, 63, 112, and 118; Color Index No. Acid Blue 9, 22, 40, 59, 93, 102, 104, 113, 117, 120, 167, 229, and 234; Color Index No. Acid Red 1, 6, 32, 37, 51, 52, 80, 85, 87, 92, 94, 115, 181, 256, 289, 315, and 317; Color Index No. Acid Yellow 11, 17, 23, 25, 29, 42, 61, and 71; Color Index No. Acid Orange 7 and 19; Color Index No. Acid Violet 49; Color Index No. Food Black 1 and 2; and Color Index No. Reactive Red 180.

The blending amount of the self-dispersing type pigment and/or the water-soluble dye is determined depending on the desired color and the density. However, the blending amount is preferably 0.01 to 7% by weight, and more preferably 0.1 to 5.5% by weight with respect to the total amount of the water base ink for ink-jet recording of the present invention.

The water base ink for ink-jet recording of the present invention contains the glycol ether in which the number of carbon atoms of the ethylene oxide moiety is not less than 8 and the solubility in water at 25° C. is not less than 1%. As a result of diligent investigations performed by the present inventors, it has been found out that the water base ink for ink-jet recording, in which both of the reduction of the blurring on the paper surface and the drying performance are simultaneously satisfied, is obtained by blending the glycol ether in which the number of carbon atoms of the ethylene oxide moiety is not less than 8 and the solubility in water at 25° C. is not less than 1%. Thus, the present invention has been completed.

Usually, when the ink is permeated into the paper, then the ink is permeated into the fibers of the paper to cause the feathering in some cases, and the ink is permeated into the gap between the fibers of the paper in other cases. In order to reduce the blurring on the paper surface, it is necessary that the feathering is suppressed and the ink is allowed to permeate into the gap between the fibers. The present inventors have found out the following fact. That is, when the ink contains the glycol ether, the process is classified into two cases, i.e., a case in which the ink is principally permeated into the fibers of the paper and a case in which the ink is permeated into the gap between the fibers of the paper, depending on the number of carbons of the ethylene oxide moiety of the glycol ether. That is, when the number of carbon atoms of the ethylene oxide moiety is not more than 6, the permeation is principally advanced along the fibers of the paper to cause the feathering. When the number of carbon atoms of the ethylene oxide moiety is not less than 8, then the ink is principally permeated into the gap between the fibers of the paper, and the blurring can be reduced on the paper surface. On the other hand, in general, the larger the number of carbon atoms of the ethylene oxide moiety is, the higher the hydrophobicity of glycol ether is. When the hydrophobicity is increased, then the permeability into the paper is improved, and the drying time is shortened. Therefore, the drying performance on the paper surface is improved. However, in order to blend the glycol ether into the water base ink for ink-jet recording, it is necessary to possess a certain degree of solubility in water. Accordingly, when the glycol ether, in which the number of carbon atoms of the ethylene oxide moiety is not less than 8 and the solubility in water at 25° C. is not less than 1%, is used, then the solubility in water, which is required to be blended in the water base ink for ink-jet recording, is provided, and it is possible to satisfy both of the reduction of the blurring on the paper surface and the drying performance of the water base ink for ink-jet recording.

The glycol ether, in which the number of carbon atoms of the ethylene oxide moiety is not less than 8 and the solubility in water at 25° C. is not less than 1%, may include, for example, tetraethylene glycol butyl ether, tetraethylene glycol dimethyl ether, tetraethylene glycol methyl ether, tripropylene glycol butyl ether, and tripropylene glycol methyl ether. The method for measuring the solubility in water is not specifically limited. The method may include, for example, a method in which a certain liquid is added dropwise to a predetermined amount of water while performing agitation to determine the point at which the turbidity appears; and a method in which a mixture liquid having an arbitrary composition is prepared followed by being left to stand at a certain temperature for a long period of time to measure the volumes of two phases after being separated into the two phases so that the solubility is calculated.

It is preferable that the blending amount of the glycol ether is 0.5 to 20% by weight with respect to the total amount of the water base ink for ink-jet recording of the present invention. Within this range, it is possible to satisfy both of the reduction of the blurring on the paper surface and the drying performance in a well-balanced manner. The blending amount of the glycol ether with respect to the total amount of the ink is more preferably not less than 5% by weight and especially preferably not less than 7% by weight.

In order to regulate or adjust the viscosity and the surface tension, a water-soluble organic solvent other than the glycol ether may be blended in the water base ink for ink-jet recording of the present invention within a range in which the printing performance is not deteriorated. The water-soluble organic solvent is not specifically limited, including, for example, polyalkylene glycols, alkylene glycols, alkylene glycol ethers, glycerol, and pyrrolidones. The water-soluble organic solvent as described above may be used singly, or two or more of the water-soluble organic solvents may be used in combination.

It is preferable that the blending amount of the water-soluble organic solvent is 10 to 45% by weight with respect to the total amount of the water base ink for ink-jet recording of the present invention. If the blending amount is less than 10% by weight, then the moistening action is insufficient, and problems of deposition and dry-up arise in some cases. If the blending amount exceeds 45% by weight, then the viscosity is unnecessarily increased, the jetting operation cannot be performed in some cases, and the ink is dried extremely slowly on the paper surface in other cases. More preferably, the blending amount is 15 to 40% by weight.

The water base ink for ink-jet recording of the present invention contains water. As for the water, it is preferable to use, for example, pure water and distilled water which are generally used for the water base ink for ink-jet recording and which contain few contents of cationic ions and anionic ions. It is preferable that the blending amount of the water is 50 to 75% by weight with respect to the total amount of the water base ink for ink-jet recording of the present invention. If the blending amount is less than 50% by weight, then the viscosity of the water base ink for ink-jet recording of the present invention is increased, and hence the ink is hardly introduced into the nozzle in some cases. If the blending amount exceeds 75% by weight, then the viscosity of the ink after the evaporation of volatile components is excessively increased, and the nozzle restoration performance is lost in some cases.

The water base ink for ink-jet recording of the present invention may further contain, for example, pH-adjusting agents, sequestering agents, viscosity-adjusting agents, surface tension-adjusting agents, moistening agents, specific resistance-adjusting agents, film-forming agents, ultraviolet-absorbing agents, antioxidants, antifading agents, rustproofing agents, and antiseptic agents within ranges in which the dispersion stability of the self-dispersing pigment is not lowered, depending on the purposes to improve, for example, the discharge stability, the adaptability to the materials for the printing head and the ink cartridge, the storage stability, and the image storage performance. When the water base ink for ink-jet recording of the present invention is applied to the ink-jet system in which the ink is jetted in accordance with the action of the thermal energy, then thermal physical values including, for example, those of the specific heat, the coefficient of thermal expansion, and the coefficient of thermal conductivity may be adjusted.

The water base ink for ink-jet recording of the present invention contains the glycol ether in which the number of carbon atoms of the ethylene oxide moiety is not less than 8 and the solubility in water at 25° C. is not less than 1%. Accordingly, the ink is mainly permeated into the gap between the fibers of the paper, and it is possible to satisfy both of the drying performance and the reduction of the blurring on the paper surface. Further, the dispersion state of the self-dispersing type pigment is not deteriorated as well.

EXAMPLES

The present invention will be explained in further detail below as exemplified by Examples. However, the present invention is not limited to only Examples.

Examples 1 to 5

Compositions shown in Table 1 were subjected to mixing and agitation, followed by being filtrated through a membrane filter of 2 µm to prepare black inks. CABO-O-JET 300 (produced by Cabot, pigment content: 15% by weight) or Microjet CW-1 (produced by Orient Chemical Industries, Ltd., pigment content: 20% by weight), in which the surface of carbon black was treated, was used as the self-dispersing type pigment. Tetraethylene glycol butyl ether or tripropylene glycol butyl ether was used as the glycol ether in which the number of carbon atoms of the ethylene oxide moiety was not less than 8 and the solubility in water at 25° C. was not less than 1%. The solubility of tetraethylene glycol butyl ether in water at 25° C. was not less than 100%, and the solubility of tripropylene glycol butyl ether in water at 25° C. was 1.5%.

TABLE 1

| Ink material | Composition ratio (parts by weight) | | | | |
|---|---|---|---|---|---|
| | Ex. 1 | Ex. 2 | Ex. 3 | Ex. 4 | Ex. 5 |
| CABO-O-JET 300 | 33.3 | 33.3 | 33.3 | — | 33.3 |
| Microjet CW-1 | — | — | — | 25 | — |
| Glycerol | 20 | 20 | 20 | 20 | — |
| Polyethylene glycol #200 | — | — | — | — | 20 |
| 2-Pyrrolidone | — | — | — | — | 8 |
| Distilled water | 39.7 | 45.7 | 38.7 | 49.5 | 31.7 |
| Tetraethylene glycol butyl ether | 7 | — | 5 | — | 7 |
| Tripropylene glycol butyl ether | — | 1 | — | 1 | — |
| Dipropylene glycol propyl ether | — | — | 3 | — | — |
| Triethylene glycol ethyl ether | — | — | — | 4.5 | — |

Example 6

A composition shown in Table 2 was subjected to mixing and agitation, followed by being filtrated through a membrane filter of 2 µm to prepare a yellow ink. Tetraethylene glycol butyl ether was used as the glycol ether in which the number of carbon atoms of the ethylene oxide moiety was not less than 8 and the solubility in water at 25° C. was not less than 1%. A yellow self-dispersing type pigment was prepared in accordance with the following procedure. (1) 20 g of an isoindolinone pigment (Pigment Yellow 110) and 500 g of quinoline were mixed with each other, followed by being dispersed for 3 hours by using a bead mill. (2) A mixture obtained in (1) was subjected to a reduced pressure to remove water as far as possible. (3) The temperature was raised to 160° C., and 20 g of a sulfonated pyridine complex was added, followed by being agitated for 4 hours. (4) A slurry obtained in (3) was washed with quinoline and poured into water, followed by being washed with water and dried. After that, the pigment concentration was adjusted to 15% by weight with water to obtain a dispersion of 15% by weight of surface-treated isoindolinone pigment.

TABLE 2

| Ink material | Composition ratio (parts by weight) Example 6 |
|---|---|
| Dispersion of 15% by weight of isoindolinone pigment | 33.3 |
| Polyethylene glycol #200 | 20 |
| 2-Pyrrolidone | 8 |
| Distilled water | 31.7 |
| Tetraethylene glycol butyl ether | 7 |

Example 7

A composition shown in Table 3 was subjected to mixing and agitation, followed by being filtrated through a membrane filter of 2 µm to prepare a magenta ink. Tetraethylene glycol butyl ether was used as the glycol ether in which the number of carbon atoms of the ethylene oxide moiety was not less than 8 and the solubility in water at 25° C. was not less than 1%. A magenta self-dispersing type pigment was prepared in accordance with the following procedure. (1) 20 g of a dimethyl quinacridone pigment (Pigment Red 122) and 500 g of quinoline were mixed with each other, followed by being dispersed for 3 hours by using a bead mill. (2) A mixture obtained in (1) was subjected to a reduced pressure to remove water as far as possible. (3) The temperature was raised to 160° C., and 20 g of a sulfonated pyridine complex was added, followed by being agitated for 4 hours. (4) A slurry obtained in (3) was washed with quinoline and poured into water, followed by being washed with water and dried. After that, the pigment concentration was adjusted to 15% by weight with water to obtain a dispersion of 15% by weight of surface-treated dimethyl quinacridone pigment.

TABLE 3

| Ink material | Composition ratio (parts by weight) Example 7 |
|---|---|
| Dispersion of 15% by weight of quinacridone magenta pigment | 33.3 |
| Polyethylene glycol #200 | 20 |
| 2-Pyrrolidone | 8 |
| Distilled water | 31.7 |
| Tetraethylene glycol butyl ether | 7 |

Example 8

A composition shown in Table 4 was subjected to mixing and agitation, followed by being filtrated through a membrane filter of 2 µm to prepare a cyan ink. Tetraethylene glycol butyl ether was used as the glycol ether in which the number of carbon atoms of the ethylene oxide moiety was not less than 8 and the solubility in water at 25° C. was not less than 1%. A cyan self-dispersing type pigment was prepared in accordance with the following procedure. (1) 30 g of a phthalocyanine blue pigment (Pigment Blue 15:3) and 6.0 g of sulfanilic acid were mixed with each other. (2) 100 g of an aqueous solution of sodium nitrite of 0.3% by weight was added dropwise to a mixture obtained in (1) while performing agitation. (3) Agitation was performed at 70° C. for 1 hour, followed by being filtrated and repeatedly washed with water to effect purification. (4) A slurry obtained in (3) was dried, followed by being dispersed in 200 ml of water. The pigment concentration was adjusted to 15% by weight to obtain a dispersion of 15% by weight of surface-treated phthalocyanine blue pigment.

TABLE 4

| Ink material | Composition ratio (parts by weight) Example 8 |
|---|---|
| Dispersion of 15% by weight of phthalocyanine blue pigment | 33.3 |
| Polyethylene glycol #200 | 20 |
| 2-Pyrrolidone | 8 |
| Distilled water | 31.7 |
| Tetraethylene glycol butyl ether | 7 |

Comparative Examples 1 to 4

Compositions shown in Table 5 were subjected to mixing and agitation, followed by being filtrated through a membrane filter of 0.7 μm to prepare black inks. The solubility of diethylene glycol butyl ether in water at 25° C. was not less than 100%, the solubility of triethylene glycol butyl ether in water at 25° C. was not less than 100%, the solubility of triethylene glycol propyl ether in water at 25° C. was not less than 100%, and the solubility of propylene glycol butyl ether in water at 25° C. was 6.4%.

TABLE 5

| | Composition ratio (parts by weight) | | | |
|---|---|---|---|---|
| Ink material | Comp. Ex. 1 | Comp. Ex. 2 | Comp. Ex. 3 | Comp. Ex. 4 |
| CABO-O-JET 300 | 33.3 | 33.3 | 33.3 | 33.3 |
| Glycerol | 20 | 20 | 20 | 20 |
| Distilled water | 38.7 | 38.7 | 41.7 | 44.7 |
| Diethylene glycol butyl ether | 8 | — | — | — |
| Triethylene glycol butyl ether | — | 8 | — | — |
| Triethylene glycol propyl ether | — | — | 5 | — |
| Propylene glycol butyl ether | — | — | — | 2 |

Comparative Examples 5 to 8

Compositions shown in Table 6 were subjected to mixing and agitation, followed by being filtrated through a membrane filter of 2 μm to prepare inks of respective colors. The solubility of triethylene glycol monobutyl ether in water at 25° C. was not less than 100%.

TABLE 6

| | Composition ratio (parts by weight) | | | |
|---|---|---|---|---|
| Ink material | Comp. Ex. 5 | Comp. Ex. 6 | Comp. Ex. 7 | Comp. Ex. 8 |
| CABO-O-JET 300 | 33.3 | 33.3 | — | — |
| Dispersion of 15% by weight of isoindolinone pigment prepared in Example 6 | — | — | 33.3 | 33.3 |
| Triethylene glycol monobutyl ether | 6 | 8 | 6 | 8 |
| Polyethylene glycol #200 | 24 | 24 | 24 | 24 |
| Distilled water | 36.7 | 34.7 | 36.7 | 34.7 |

EVALUATION

The blurring and the drying performance were evaluated in accordance with the following procedure for the inks prepared in Examples 1 to 8 and Comparative Examples 1 to 8. (1) An ink-jet printer (produced by Brother Industries, Ltd., MFC 7400 J), which was designed to perform the recording by generating liquid droplets by applying the pressure by means of the vibration of a piezoelectric element, was used to continuously print letters of "A" in the paper feed direction with 1 mm width lines on XEROX 4200 paper. (2) Line widths of the 1 mm width lines were observed under a microscope to record values of maximum line widths (Wmax). Results were evaluated in accordance with the following criteria. ++: Wmax=1 to 1.1 mm, +: Wmax=1.1 to 1.2 mm, ±: Wmax=1.2 to 1.3 mm, −: Wmax= not less than 1.3 mm. (3) After printing the letters "A", the printed portion was immediately rubbed with a cotton swab. The drying time of the ink was calculated on the basis of the portion at which any disturbance or disorder of the printing was observed. Results were evaluated in accordance with the following criteria. ++: drying time=not more than 0.5 second, +: drying time=0.5 to 1 second, ±: drying time=1 to 1.5 seconds, −: drying time=not less than 1.5 seconds.

Results of the evaluation are shown in Table 7.

TABLE 7

| | Example | | | | | | | | Comparative Example | | | | | | | |
|---|---|---|---|---|---|---|---|---|---|---|---|---|---|---|---|---|
| Test item | 1 | 2 | 3 | 4 | 5 | 6 | 7 | 8 | 1 | 2 | 3 | 4 | 5 | 6 | 7 | 8 |
| Blurring | ++ | + | ++ | ++ | + | ++ | ++ | + | ± | ± | ± | ++ | ± | ± | ± | ± |
| Drying performance | ++ | ++ | + | + | ++ | + | ++ | ++ | ++ | ++ | + | − | + | ++ | + | + |

According to Table 7, it is appreciated that both of the blurring property and the drying performance can be satisfied when the number of carbon atoms of the ethylene oxide moiety is not less than 8 and the solubility in water at 25° C. is not less than 1% in the glycol ether.

An embodiment of an ink cartridge which contains the water base ink in accordance with the invention is shown in FIG. 1. The ink cartridge 22 has four compartments 22b, 22c, 22m, 22y which contain the black ink, cyan ink, magenta ink and yellow ink as prepared in the above examples, respectively. The compartment 22b, 22c, 22m, 22y may be formed integrally or independently. The ink cartridge 22 is removably installed on an ink jet head 18. The ink jet head 18 has nozzle heads 21*b*, 21*c*, 21*m*, 21*y* which communicate with the compartment 22*b*, 22*c*, 22*m*, 22*y* to eject the black ink, cyan ink, magenta ink and yellow ink, respectively. A plurality of nozzles 24 are formed on the surface 23 of each nozzle head. The ink jet head is typically mounted on a carriage 17 which moves on and along a surface of a recording sheet.

According to the present invention, it is possible to provide the water base ink for ink-jet recording which makes it possible to reduce the blurring on the paper surface, which is excellent in drying performance, and in which the pigment is stably dispersed.

What is claimed is:

1. A water base ink for ink-jet recording comprising:
   a self-dispersing pigment selected from the group consisting of a surface-treated isoindolinone pigment, a surface-treated dimethyl quinacridone pigment, and a surface-treated phthalocyanine pigment;
   water; and
   glycol ether in which a number of carbon atoms of an ethylene oxide moiety is not less than 8.

2. The water base ink for ink-jet recording according to claim 1, wherein the glycol ether is contained by not less than 5% by weight.

3. The water base ink for ink-jet recording according to claim 1, wherein the glycol ether is tetraethylene glycol butyl ether or tripropylene glycol butyl ether.

4. The water base ink for ink-jet recording according to claim 1, wherein the glycol ether has a solubility in water at 25° C. of not less than 1%.

5. The water base ink for ink-jet recording according to claim 1, wherein the ink contains no other glycol ether except for the glycol ether in which a number of carbon atoms of an ethylene oxide moiety is not less than 8.

6. The water base ink for ink-jet recording according to claim 1, further containing 2-pyrrolidone.

7. An ink cartridge comprising the water base ink for ink-jet recording as defined in claim 1.

8. A water base ink for ink-jet recording comprising:
   a self-dispersing pigment, a surface thereof being sulfonated;
   water; and
   glycol ether in which a number of carbon atoms of an ethylene oxide moiety is not less than 8.

9. The water base ink for ink-jet recording according to claim 8, wherein the glycol ether is contained by not less than 5% by weight.

10. The water base ink for ink-jet recording according to claim 8, wherein the glycol ether is tetraethylene glycol butyl ether or tripropylene glycol butyl ether.

11. The water base ink for ink-jet recording according to claim 8, wherein the glycol ether has a solubility in water at 25° C. of not less than 1%.

12. The water base ink for ink-jet recording according to claim 8, wherein the ink contains no other glycol ether except for the glycol ether in which a number of carbon atoms of an ethylene oxide moiety is not less than 8.

13. The water base ink for ink-jet recording according to claim 8, further containing 2-pyrrolidone.

14. An ink cartridge comprising the water base ink for ink-jet recording as defined in claim 8.

15. A water base ink for ink-jet recording comprising:
   a self-dispersing pigment;
   water;
   2-pyrrolidone; and
   tetraethylene glycol butyl ether.

16. The water base ink for ink-jet recording according to claim 15, wherein the tetraethylene glycol butyl ether is contained by not less than 5% by weight.

17. The water base ink for ink-jet recording according to claim 15, wherein the ink contains no other glycol ether except for tetraethylene glycol butyl ether.

18. An ink cartridge comprising the water base ink for ink-jet recording as defined in claim 15.

19. A water base ink for ink-jet recording comprising:
   a self-dispersing pigment;
   water; and
   tripropylene glycol butyl ether.

20. The water base ink for ink-jet recording according to claim 19, wherein the tripropylene glycol butyl ether is contained by not less than 5% by weight.

21. The water base ink for ink-jet recording according to claim 19, wherein the ink contains no other glycol ether except for tripropylene glycol butyl ether.

22. An ink cartridge comprising the water base ink for ink-jet recording as defined in claim 19.

* * * * *